July 25, 1950  H. C. BOARDMAN  2,516,100
METHOD OF WELDING LAMINATED PLATES
Filed Oct. 6, 1945
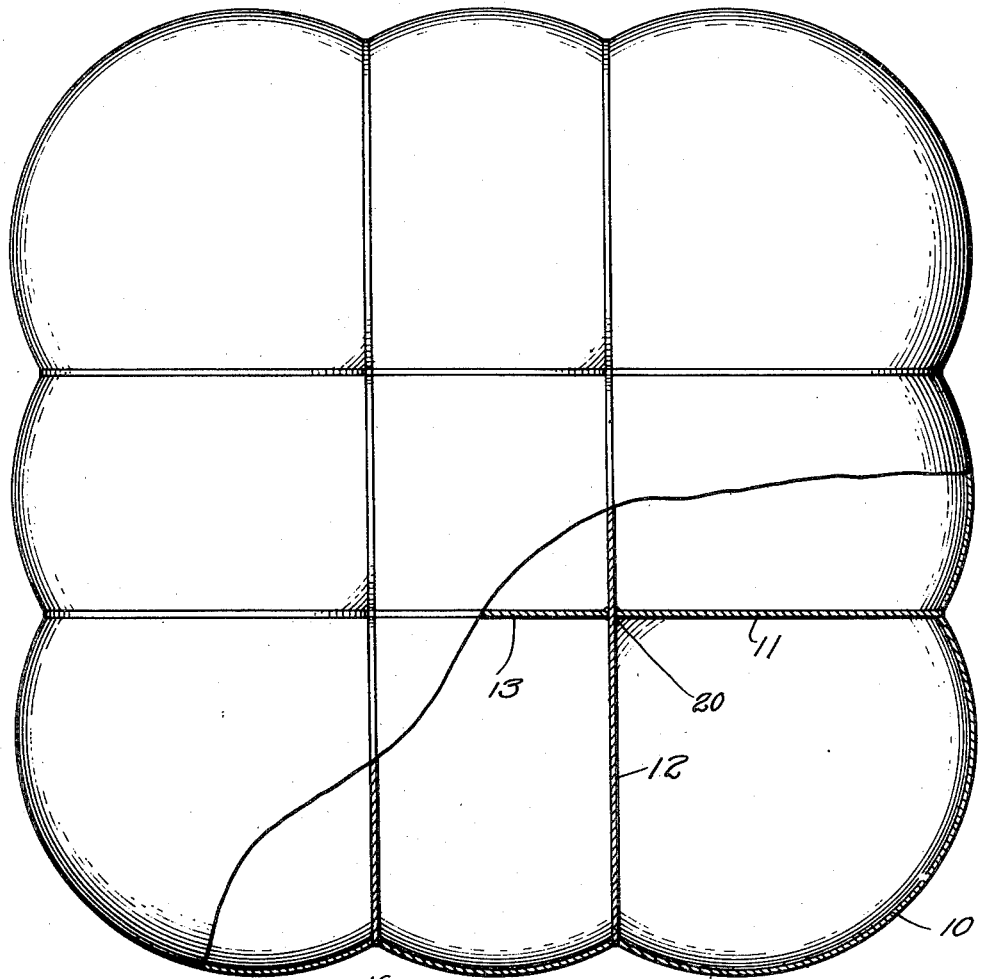
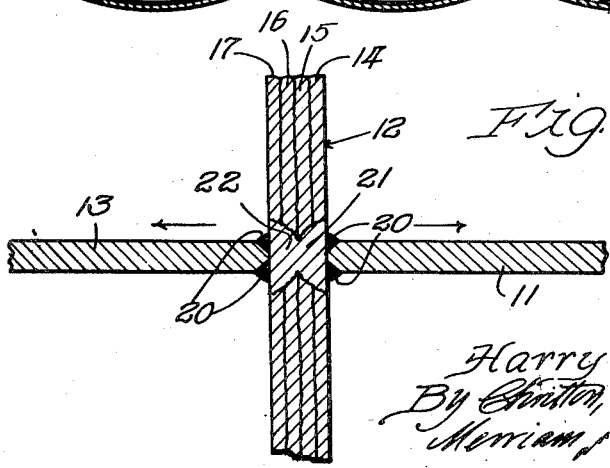

Patented July 25, 1950

2,516,100

UNITED STATES PATENT OFFICE 2,516,100

METHOD OF WELDING LAMINATED PLATES

Harry C. Boardman, Chicago, Ill., assignor to Chicago Bridge & Iron Company, a corporation of Illinois Application October 6, 1945, Serial No. 620,694

5 Claims. (Cl. 220—1)

This invention relates to a method of welding laminated plates, and more particularly to welded tanks in which laminated diaphragms are employed as anchors for opposed tension members, and particularly for opposed diaphragms.

The invention is illustrated in the drawing in which:

Fig. 1 is a plan view partly in section of a pressure vessel to which the invention is applicable.

Fig. 2 is an enlarged view in section of an intersection of a laminated diaphragm and opposed tension members.

The vessel 10, illustrated in Fig. 1, is comprised of a plurality of intersecting spherical segments, the edges of which are joined by diaphragms 11, 12 and 13. It will be noticed that diaphragm 12 extends from one side of the vessel to the other, whereas diaphragms 11 and 13 are joined at diaphragm 12. Diaphragm 12 is illustrated as laminated, being made up of sheets 14, 15, 16 and 17. Diaphragms 11 and 13 are under tension and thereafter tend to disrupt the laminae in diaphragm 12. Normally diaphragms 11 and 13 are joined to the diaphragm 12 by welding, as indicated at 20.

In accordance with this invention, prior to the welding I apply sufficient heat to the opposed side of the diaphragm 12 to form arcuate portions 21 and 22 throughout which the metal is completely fused together. These areas cover the portions to which the diaphragms are to be welded and extend beyond the same, the radius of the arcuate portion being approximately the thickness of the diaphragms 11 and 13. The fusion is preferably done with the plates in a down-flat position and is not carried to the extent where the metal of the laminated diaphragm will flow away from the area of application of heat, but is enough to integrate the layers. The sides of the diaphragm may be fused simultaneously, or first one and then the other. When the fusion is completed the arcs intersect at their inner edges.

The foregoing detailed description has been given for clearness of understanding only, and no unnecessary limitations should be understood therefrom.

What I claim as new, and desire to secure by Letters Patent, is:

1. The method of attaching opposed tension members to a laminated plate which comprises fusing the plate in an arcuate zone adjacent the areas to be welded and overlapping the same, the amount of fused metal extending inwardly sufficiently to bind all of the laminations together, and then welding the opposed tension members within the pre-fused area.

2. A welded tank having a laminated plate of at least four plies carrying opposed tension members secured to opposite sides thereof characterized by a fused arcuate area at the point of attachment of each tension member, the arcuate areas intersecting each other at their innermost portions to bind the plies together.

3. A tank as set forth in claim 2 in which the tension members are diaphragms and the fused arcuate areas are zones extending beneath and adjacent the diaphragms.

4. The method of attaching opposed tension members to a laminated plate in a storage vessel which comprises fusing the plate in an arcuate zone adjacent the areas to be welded and overlapping the same, the amount of fused metal extending inwardly sufficiently to bind all of the laminations together; and then welding the opposed tension members within the prefused area.

5. The method as set forth in claim 1 in which the tension members are diaphragms.

HARRY C. BOARDMAN.

REFERENCES CITED

The following references are of record in the file of this patent:

UNITED STATES PATENTS

| Number | Name | Date |
|---|---|---|
| 2,012,964 | Horton | Sept. 3, 1935 |
| 2,233,455 | Larson | Mar. 4, 1941 |
| 2,341,044 | Jackson et al. | Feb. 8, 1944 |

FOREIGN PATENTS

| Number | Country | Date |
|---|---|---|
| 411,972 | Great Britain | June 21, 1934 |